United States Patent
Watkins

Patent Number: 6,028,624
Date of Patent: Feb. 22, 2000

[54] METHOD AND APPARATUS FOR INCREASED VISIBILITY THROUGH FOG AND OTHER AEROSOLS

[75] Inventor: Wendell Watkins, El Paso, Tex.

[73] Assignee: The United States of America as represented by the Secretary of the Army, Washington, D.C.

[21] Appl. No.: 08/986,988

[22] Filed: Dec. 11, 1997

[51] Int. Cl.[7] .................................................. H04N 7/18
[52] U.S. Cl. .............................. 348/122; 348/48; 348/31; 348/117
[58] Field of Search ................................ 348/31, 48, 117, 348/122, 123; H04N 7/18

[56] References Cited

U.S. PATENT DOCUMENTS

| | | | |
|---|---|---|---|
| 4,670,637 | 6/1987 | Morrison et al. | 219/121 |
| 4,805,015 | 2/1989 | Copeland | 358/88 |
| 4,819,064 | 4/1989 | Diner | 358/88 |
| 4,862,257 | 8/1989 | Ulich | 358/95 |
| 4,920,412 | 4/1990 | Gerdt et al. | 358/95 |
| 4,925,303 | 5/1990 | Pusic | 356/152 |
| 5,043,726 | 8/1991 | Shifrin | 340/953 |
| 5,270,780 | 12/1993 | Moran et al. | 358/95 |
| 5,282,589 | 2/1994 | Branigan et al. | 244/114 R |
| 5,315,363 | 5/1994 | Nettleton et al. | 356/4 |
| 5,719,567 | 2/1998 | Norris | 340/953 |

*Primary Examiner*—Howard Britton
*Assistant Examiner*—Luanne P. Din
*Attorney, Agent, or Firm*—Paul S. Clohan, Jr.

[57] ABSTRACT

A system is described that uses chopped laser illumination, chopped and filtered wide baseline stereo imaging, specular reflectors along the path to navigated, comparison of the two stereo images collected to determine and subtract from the images the magnitude of the backscatter field, inverse point spread filtering based on the fusion of the specular reflector pattern, and stereoscopic display for the pilot to allow navigation through fog and other aerosols. In particular, aircraft pilots will be able to land their aircraft in fog and other aerosols.

6 Claims, 1 Drawing Sheet

METHOD AND APPARATUS FOR INCREASED VISIBILITY THROUGH FOG AND OTHER AEROSOLS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Fog and other aerosols such as dust have caused serious problems in the area of navigation for land, air, and sea navigation. In the case of aircraft, it is the landing of the aircraft that is the crux of the problem. If the pilot could see well enough through the fog and other aerosols to determine the runway and any obstacles, he could land his aircraft. The best current system that is used is radar that transmits well through fog and other aerosols but does not have enough spatial resolution to allow pilots to land their aircraft safely.

One prior art method for "seeing through fog and other aerosols" is described in U.S. Pat. No. 4,670,637. In this method, a laser signal is directed into the fog is amplitude modulated at one of the resonant frequencies of the water droplets forming the fog at such strength as to cause the droplets having this resonant frequency to burst, thereby decreasing the scattering of the laser signal and increasing the transmission of this signal through the fog. This system, of course, does not strictly enable "seeing through fog and other aerosols" but merely aids in the transmitting of laser signals through the fog and provides a method for transmitting laser signals through fog which requires less power than if the fog had not been somewhat dissipated.

Another prior art method for "seeing through fog and other aerosols" is described in U.S. Pat. No. 4,920,412. The system includes a television camera or an optical viewer device with a gated image intensifier input. A short intense laser pulse is transmitted to illuminate the scene. The image intensifier is gated on after a time delay equal to the round trip transit time of the pulse from a range slice of interest. The image intensifier is gated on for a time interval equal to the width of the laser pulse. In the television camera embodiment, one laser pulse per frame is transmitted and successive range slices are observed during successive frames by successively increasing the time delay. The range slice images are stored in a buffer and read out to a television display. In the optical viewer device embodiment, a segmented horizontally sliced electro-optical shutter is disposed adjacent the phosphor output of the image intensifier to transmit successive range slice information to an eyepiece of the device for viewing by an observer. The optical viewer device may be mounted on a helmet with an inclinometer on the helmet providing signals to program the segmented shutter. This method does not provide any deblurring of the reflected laser radiation that produces forward scattering blur on its way back to the airplane pilot's camera.

The closest related area that has been used is that of ground vehicle navigation in fog. Yellow light headlights are used to illuminate the highway from a position close to the ground. This penetrates the fog where our human vision is most sensitive and from a position that reduces the impact of backscatter but does not utilize the benefits that can be obtained from wide baseline (hyperstereo) stereo imaging. There is currently no counterpart for aircraft.

BRIEF SUMMARY OF THE INVENTION

It is therefore an object of the present invention to improve the vision of aircraft pilots in fog and other aerosols allowing the aircraft to land at airports.

Still other objects and advantages of the present invention will become readily apparent to those skilled in this art from the detailed description, wherein only the preferred embodiment of the present invention is shown and described, simply by way of illustration of the best mode contemplated of carrying out the present invention. As will be realized, the present invention is capable of other and different embodiments, and its several details are capable of modifications in various obvious respects, all without departing from the present invention. Accordingly, the drawings and descriptions are to be regarded as illustrative in nature, and not as restrictive.

These and other objects are achieved by a system that uses an active hyperstereo imaging system to provide the pilot with an improved stereo image of the landing environment. An illuminating source, such as a helium-neon laser is used with imaging cameras equipped with narrowband filters. The camera and laser are mounted on each wing of the aircraft and provided with gyroscopic stabilization. Optical choppers are used to allow each camera to separately view the runway while it is illuminated by the laser on the opposite wing to reduce the magnitude of the laser radiation backscattered from the fog and other aerosols. Rows of specular reflectors are placed on either side of the runway to provide sources for fusing the stereo images obtained from the two cameras. Before this fusion process is performed, the two images are compared to derive the magnitude of the backscattered radiation pattern and this pattern of intensities is subtracted from each image. A set of inverse point spread filters is applied to the images and the corrected stereo images viewed by the pilot to determine the best deblurring filter to use for observing the runway for a given fog condition.

DETAILED DESCRIPTION OF THE INVENTION

Figure 1:
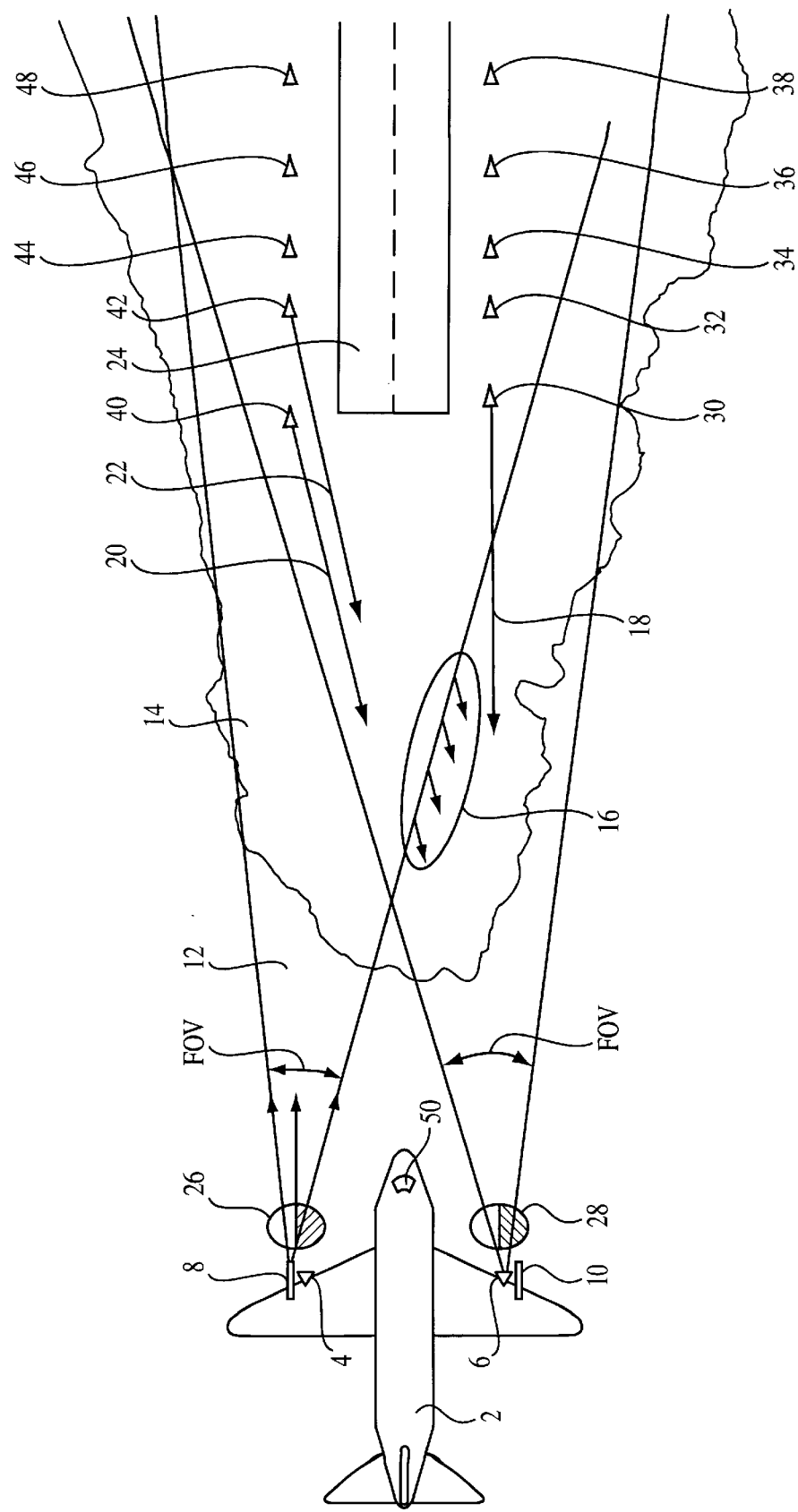
FIG. 1 depicts the use of chopped lasers, filtered cameras, specular reflectors and hyperstereo vision for landing an aircraft in fog and other aerosols.

One of the key elements of my invention is the enhanced terrain contrast obtained when low contrast scenes are viewed using wide baseline stereo goggle displays. This arises because of the strong physical process human vision utilizes to fuse the two stereo images for depth perception. There is potential to extend the application of hyperstereo vision (i.e., stereo baseline imagery with baseline separations much larger than the human eye spacing) to see through fogs for landing aircraft at airports or on aircraft carriers.

What typically happens when a ground vehicle attempts to illuminate the terrain or road in front of the vehicle with headlights is that the backscatter of the headlight radiation is so intense that there is not enough scene contrast left to distinguish the terrain ahead at night. During the day there is so much ambient radiation from the sun scattering into the fog that the reflections from the terrain ahead cannot be distinguished. What is needed is a method to illuminate the terrain with radiation that can be used to derive what the terrain ahead looks like through the fog. For landing an aircraft the use of radar does not give sufficient spatial resolution because of the very long wavelengths even though they do penetrate fogs well. Use of the thermal infrared is not a practical option because although there would be sufficient spatial resolution, the radiation does not penetrate the liquid water contained in fogs. As the wavelength of the radiation gets shorter, there is more scattering. Hence, the long wavelength visible or near infrared is probably the best spectral region to use for the illuminating source. Therefore, the use of helium-neon (He—Ne) lasers as the illuminating source is best, bearing in mind that there are other sources that could also be used. For this radiation at 632.8 nm, the lasers themselves, excellent silicon detector staring array imagers, and laser beam expansion optics are readily available off the shelf at reasonable prices.

The basic concept of the invention for seeing through fog and other aerosols is straight forward and is depicted in FIG. 1. One laser 8 and one camera 4 will be mounted on the left wing of the aircraft 2 looking or pointed forward. Another laser 10 and another camera 6 will be mounted on the right wing looking forward. The cameras 4 and 6 have a particular field-of-view (FOV) as shown. These units will be mounted symmetrically and will require gyroscopic stabilization to ensure that they look and point in a constant direction. Typical imaging and display systems operate at a 60 Hz field or 30 Hz frame rate. The lasers 8 and 10 and cameras 4 and 6 on each wing will be chopped by choppers 26 and 28 at either 30 or 60 Hz rates such that laser 8 on the left wing will be illuminating the forward terrain while the camera 6 on the right wing is viewing the terrain, while the camera 4 on the left wing and the laser 10 on the right wing are blocked. When laser 8 is blocked the camera 4 on the same wing will be unblocked and the laser 10 on the opposite wing will be illuminating the forward terrain but the camera 6 on that wing will be blocked. This arrangement is used to reduce the effects of the backscatter 16 from the laser illuminating source. The cameras 4 and 6 will be outfitted with narrow bandpass filters to allow only radiation with the same wavelength as the He—Ne laser to be detected and appropriate magnifying lenses to see far enough for landing the aircraft 2.

In and of itself the reduction in backscattered radiation 16 by the wide baseline separation from one camera to the other is not sufficient to see well enough to land an aircraft. There must be additional mitigation mechanisms involved. First, the runway 24 must be equipped with specular reflection devices 30, 32, 34, 36, 38, 40, 42,44,46, 48 spaced along each side of the runway 24 similar to those used along highways to define where the road is under poor visibility driving conditions. The reflections 18, 20, 22 of the laser radiation from this pattern of reflectors will provide the mechanism necessary to use the contrast enhancement of hyperstereo vision. The individual reflectors 30, 32, 34, 36, 38, 40, 42,44,46, 48 will provide a small area source that will be blurred by forward scattering through the fog 14 similar to that of a street light that blurs into a halo when viewed from a distance through fog. To be able to correct for this blur the signals from the rows of runway specular reflectors 30, 32, 34, 36, 38, 40, 42,44,46, 48 must be increased over the background scattering radiation. To accomplish this the side-to-side scattering intensity gradient caused by the off-axis illuminating laser source will be used. Because the laser is illuminating from the opposite wing of the aircraft 2 the scattered radiation in the forward looking image will have more scattered radiation from the fog 14 in the imagery produced on the side closest to the laser source. That means that the left image will have more scattered radiation on its right side and the right image will have more scattered radiation on its left side. The two scattered images will however be symmetrically equal if matched cameras and lasers are used. The magnitude of the fog scattering pattern can be derived by comparing one image with its opposite side camera image that is flipped left to right. This process is performed using an image processing computer with stereo headset 50 in the cockpit of the aircraft 2. What is sought is a smoothed version of the fog backscatter produced by the laser illumination. Once derived, it can be subtracted directly from the image that was not flipped left to right and then flipped left to right to subtract from the other opposite side image. The resultant images will have enhanced feature reflection radiation but will still be degraded because of forward scattering blur. At this point the power of the strong stereo fusion mechanism is used. By viewing these resultant feature images on image processing computer with stereo headset 50 with backscatter reduction the appropriate inverse filtering to eliminate the point spread function blurring can be determined. When the wide baseline stereo images are viewed the fusion of the two rows of specular reflectors 30, 32, 34, 36, 38, 40, 42,44,46, 48 will result in dramatic reduction of scene noise that does not fuse. Also reflections from background objects will be enhanced. The quality of the fusion process can be adjusted using different point spread inverse filters. Once this adjustment has been made the hyperstereo imagery will allow an enhanced view of the runway and any obstacles for safely landing aircraft 2 in fog 14.

The practicality issues will now be addressed. First, fogs typically have aerosols that are from 1 to 100 microns in diameter. Typical fog extinction coefficients begin at 2 per kilometer. Hence, the path loss of radiation would be down by a factor of 100 for a 1 km specular reflection. The backscattering coefficient will be at most 1 per kilometer per sterradian. Hence, the backscattering 16 would be at most an order of magnitude larger than the specular reflection return if the illumination were along the same line of sight as the imaging. Since the imaging is from off-axis and background scatter subtraction can be performed, there should be sufficient signal intensity from the illuminated specular reflectors 30, 32, 34, 36, 38, 40, 42,44,46, 48 to perform the hyperstereo fusion and inverse point spread function deblurring. Finally, if the aircraft 2 is flying at 480 kph (300 mph) when approaching for landing, the aircraft 2 will travel only about 2 m between camera fields. Hence, the time off-set between images used to derive the backscattering intensity pattern and hyperstereo vision fusion will have negligible parallax differences at a couple hundred meters or more necessary to perform safe landing of the aircraft 2.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents there of.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

I claim:

1. A system to aid a pilot in landing an aircraft on a runway in fog and other aerosols comprising:

a first laser and a first camera mounted on the left wing of said aircraft and pointed forward;

a second laser and a second camera mounted on the right wing of said aircraft and pointed forward;

means for chopping the emissions from said lasers such that said first laser on the left wing of said aircraft will be illuminating the forward terrain as said second camera on the right wing is viewing the terrain, while said first camera on the left wing and said second laser on the right wing are blocked, and said second laser on the right wing of said aircraft will be illuminating the forward terrain as said first camera on the left wing is viewing the terrain, while said second camera on the right wing and said first laser on the left wing are blocked;

said cameras being outfitted with narrow bandpass filters to allow only radiation with the same wavelength as said lasers to enter said cameras;

said runway being equipped with specular reflection devices spaced along each side of said runway; and computer means for comparison of the two stereo images collected from said cameras to determine and subtract from the images the magnitude of the backscatter field, the inverse point spread filtering based on the fusion of the specular reflector pattern, and to provide a stereoscopic display for the pilot to allow said pilot to safely land said airplane in said fog.

2. The system of claim 1 wherein said lasers are He—Ne lasers.

3. The system of claim 2 wherein said He—Ne lasers operate at a frequency of 632.8 nm.

4. The system of claim 1 wherein said means for chopping comprises a chopper operating at 60 Hz.

5. The system of claim 1 wherein said means for chopping comprises a chopper operating at 30 Hz.

6. The system of claim 1 further incorporating gyroscopic stabilization for said lasers and said cameras.

* * * * *